(12) United States Patent
Durst

(10) Patent No.: US 11,221,639 B2
(45) Date of Patent: Jan. 11, 2022

(54) METHOD AND SYSTEM FOR RATING BUILDING ENERGY PERFORMANCE

(71) Applicant: AREVS, LLC, Queensbury, NY (US)

(72) Inventor: Dean H. Durst, Scotia, NY (US)

(73) Assignee: AREVS, LLC, Queensbury, NY (US)

( * ) Notice: Subject to any disclaimer, the term of this patent is extended or adjusted under 35 U.S.C. 154(b) by 0 days.

(21) Appl. No.: 16/238,321

(22) Filed: Jan. 2, 2019

(65) Prior Publication Data

US 2019/0272000 A1 Sep. 5, 2019

Related U.S. Application Data

(63) Continuation of application No. 14/399,394, filed as application No. PCT/US2013/041258 on May 15, 2013, now abandoned.

(60) Provisional application No. 61/647,415, filed on May 15, 2012, provisional application No. 61/769,193, filed on Feb. 25, 2013.

(51) Int. Cl.
*G05F 1/66* (2006.01)
*G06Q 90/00* (2006.01)
*G05B 15/02* (2006.01)
*G06N 5/04* (2006.01)
*G06Q 50/06* (2012.01)

(52) U.S. Cl.
CPC .......... *G05F 1/66* (2013.01); *G05B 15/02* (2013.01); *G06N 5/04* (2013.01); *G06Q 50/06* (2013.01); *G06Q 90/00* (2013.01)

(58) Field of Classification Search
None
See application file for complete search history.

(56) References Cited

U.S. PATENT DOCUMENTS

| 8,155,900 | B1 * | 4/2012 | Adams | H04L 12/66 |
| | | | | 702/62 |
| 2007/0203860 | A1 * | 8/2007 | Golden | G06Q 10/04 |
| | | | | 705/412 |
| 2011/0046806 | A1 * | 2/2011 | Nagel | H04L 67/125 |
| | | | | 700/291 |
| 2011/0137763 | A1 * | 6/2011 | Aguilar | G06Q 30/018 |
| | | | | 705/30 |
| 2014/0143179 | A1 * | 5/2014 | Takaoka | G06Q 50/06 |
| | | | | 705/412 |

FOREIGN PATENT DOCUMENTS

WO WO-2011072332 A1 * 6/2011 ............. G05B 15/02

* cited by examiner

*Primary Examiner* — Umut Onat
(74) *Attorney, Agent, or Firm* — David L. Principe; Phillips Lytle LLP

(57) ABSTRACT

A method of predicting energy usage having the steps of providing a computer, providing a temperature database, providing a building asset rating database, receiving inputs from a user having a floor area measure of a building, an energy usage measurement, an energy usage start date, an energy usage end date, and a geographic location identifier, determining an estimated energy rating as a function of the inputs, the temperature database, and the building asset rating database, and providing the estimated energy rating to the user.

11 Claims, 3 Drawing Sheets

METHOD AND SYSTEM FOR RATING BUILDING ENERGY PERFORMANCE

CROSS-REFERENCE TO RELATED APPLICATIONS

This application claims priority from U.S. provisional app. No. 61/647,415 which was filed on 15 May 2012, and U.S. provisional app. No. 61/769,193 which was filed on 25 Feb. 2013, each of which is incorporated by reference in its entirety.

TECHNICAL FIELD

The present invention relates generally to the field of rating the energy efficiency of buildings, and more specifically to methods and systems for automatically estimating established building energy rating methods.

BACKGROUND ART

Several types of energy performance rating systems are known. Such systems are typically asset based, that is based upon physical characteristics and inspections of a given building. Two such systems are provided by the US Department of Energy, and RESNET. Both are nationally recognized as using certified rating methods. The Department of Energy's rating system is the newly released Home Energy Score, which rates houses on a scale of 1 to 10, with 10 being the most efficient and 1 being a home in need of extreme weatherization measures. The Department of Energy's rating is accomplished via a 3 page questionnaire which assesses building "characteristics" and is essentially designed to be a very high level (not detailed) asset assessment of a home's energy efficiency.

RESNET created and utilizes the Home Energy Rating Score Index (the "HERS Index"). The HERS Index number is on a scale from 0 to 150. 0 is a zero net energy home, and 100 is the "standard" new home built in strict accordance with 2004 residential energy code and Energy Star Standards. Homes scoring above 100 are less energy efficient than the "standard" model. The lower the number on the HERS scale, the more energy efficient the home. The HERS Index rating is the nationally accepted method of rating the energy efficiency of new homes. The HERS rating method is used for rating the energy performance of newly constructed homes, and requires two inspections during the construction process and a final testing of the completed structure.

BRIEF SUMMARY OF THE INVENTION

With parenthetical reference to the corresponding parts, portions or surfaces of the disclosed embodiment, merely for the purposes of illustration and not by way of limitation, provided is. A system for predicting energy factors comprising: a user interface for receiving: a HERS index; a date range; a building square footage; a building location; a computer; a database comprising: average temperature for zipcode for a given day; an calculation module providing an estimate of the BTU/sqft/HDD, wherein said output is a function of said HERS index, date range, square footage and a building location.

DETAILED DESCRIPTION OF THE PREFERRED EMBODIMENTS

Figure 1:
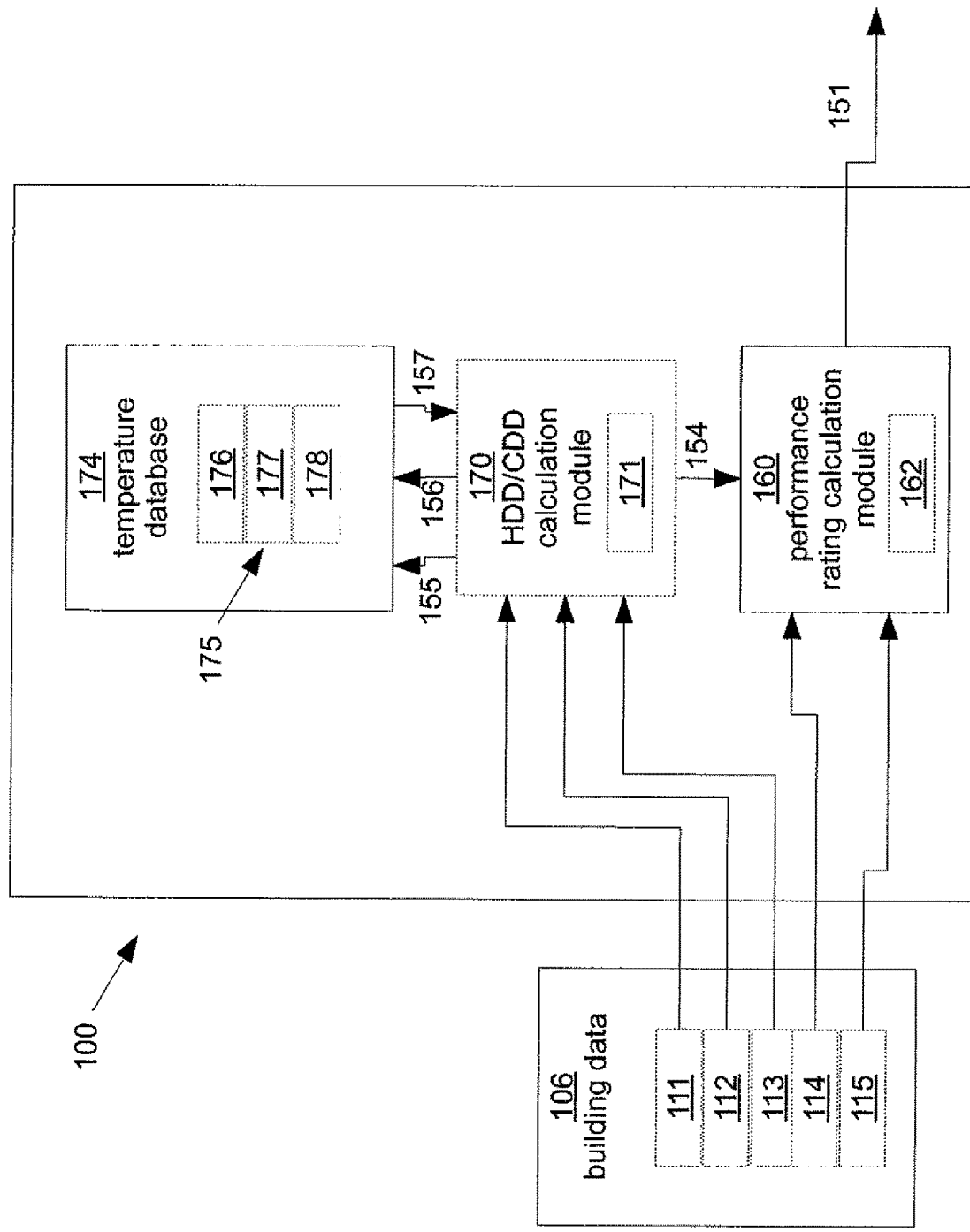
FIG. 1 is a block diagram of a first general embodiment system for providing a building energy rating.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The disclosed invention embodiments provide a system and method for providing a building energy performance rating given a set of characteristics associated with a building. A building is broadly defined as a manmade structure used for shelter including a house, an apartment building, a commercial building, or any other similar structure. The disclosed embodiments provide a system and method for determining an energy performance rating needing only the limited information of an actual heating bill, a building's livable area, and the geographic location of a building. The disclosed embodiments are able to provide an accurate estimate of the popular RESNET and HERS Index rating systems, without the need for a lengthy inspection and/or an extensive questionnaire based process. The disclosed embodiments include an advanced algorithm which utilizes a large database of building data and geographic temperature data to calculate a most likely performance rating for a building based on limited information provided. Other calculations, such as estimated yearly heating fuel costs, cooling costs, ad or electricity costs are also provided by the system. In order to predict energy performance ratings with a higher degree of certainty, additional building data may be provided to the system including: the number of occupants residing at a building, the number of rooms and room types, actual past electricity usage records, local heating fuel and electricity costs, and other similar data.

Referring now to the drawings, and more particularly to FIG. 1, shown at 100 is a system for providing an energy performance rating. System 100 receives building data 106 as input, and provides an energy rating number ("ERN") energy performance rating 151 as output. System 100 has the major components of temperature database 174, degree day calculation module 170, and performance rating calculation module 160.

Building data 106 that is provided to system 100 includes both energy performance based data and static, physical characteristic based data. More specifically, building data 106 includes a measurement of energy usage over a given period of time, which consists of energy usage start date 111, energy usage end date 112, and energy usage amount 114.

The energy usage start date 111, and energy usage end date 112 are typical month-date-year date values which are typically available from a heating bill. For example, a heating bill may have a energy usage start date 111 of Jan. 1, 2012, and an energy usage end date 112 of Jan. 31, 2012. As an alternative, a more accurate measurement of the exact start date and end date may include a time of day. The energy usage amount 114 is provided in BTU's (British Thermal Units). Many utility companies provide the number of BTU's used in a bill period. Alternatively, the energy usage amount may be provided in other energy units, such as gallons or liters of heating fuel, kilowatt-hours of electricity, kilograms or tons of pellets, therms of natural gas, cords of wood, or any other similar energy unit. Whatever type of energy unit is originally provided, the usage amount is converted to a common unit type, such as BTU's.

Building data 106 also includes the building's geographic location 113. Geographic location 113 may be provided in formats such as zip code, mailing address, GPS coordinates, or some other similar geographic location type. Whatever unit the geographic location is originally provided in, it is then converted to a geographic zip code for further processing by the system. Building data 106 additionally includes building area 115. Building area 115 is a measurement of the livable area in the building. The provided livable area is converted into units of square feet (sq. ft.) when received by system 100.

Degree day calculation module 170 provides the cumulative number of degree days at a given geographic location for a provided date range. More specifically, degree day calculation module 170 is provided an energy usage data start date 111 and end date 112, as well as geographic location 113, and in return determines the number of degree days 154 at the provided geographic location for the provided date range. As used herein, a degree day is the sum of the difference between the average temperature at a given geographic location and an either heating or cooling threshold temperature 171 for a given time period. For example, a user may want to know the number heating degree days for the time period of Jan. 1, 2012 to Jan. 3, 2012 at the geographic zip code location of 14203, using a threshold temperature of 65 degrees Fahrenheit. Degree day calculation module 170 will first determine the average temperatures on of days Jan. 1, Jan. 2, and Jan. 3, 2012. Module 170 will then subtract the average temperature of each day from the threshold temperature of 65 degrees. The sum of these differences is provided by module 170 as the total (heating) degree days 154.

In order to calculate the degree days, module 170 uses historical temperature database 174. Temperature database 174 consists of a number of historically recorded temperatures for given dates at given geographic locations. More specifically, temperature database 174 has a number of database records 175, each database record 175 including geographic location 176, temperature 177, and date-time 178. Geographic location 176 is a zip code or other similar geographic location type. Temperature 177 is a temperature measured in Fahrenheit, Celsius, or other scale. In this embodiment, temperature 177 is an average temperature recorded over a given day (such as the average temperature recorded over a day). However, other temperature measurements, such as a high or low temperature recorded over a day, or an instantaneous temperature measured at a specific date-time may be used in addition, or as an alternative to a daily average temperature.

Degree day calculation module 170 uses temperature database 174 by sequentially requesting the average temperature for each day in the appropriate date range for the provided geographic zip code. As shown in FIG. 1. temperature database 174 receives the requested date-time from module 170 as shown by line 155. Similarly, temperature database receives the geographic zip code as shown by line 156. Temperature database 174 in response provides module 170 the average temperature for the provided date-time and geographic zip code as shown on return line 157.

Performance rating calculation module 160 calculates ERN performance rating 151 based on data received from degree day calculation module 170 and building data 106. More specifically, performance rating calculation module 160 receives total degree days 154 from degree day module 170. Performance rating calculation module 160 also receives energy usage amount 114 and building area 115 from building data 106. Performance rating calculation module uses function/algorithm 162 to calculate performance rating 151 from inputs 114, 115, and 154. In a most basic form, function/algorithm 162 uses the following function to calculate the ERN energy performance rating:

$$ERN = (\text{energy usage})/(\text{degree days})/(\text{building area})$$

In another form, a scaling constant is multiplied by the result:

$$\text{Scaled } ERN = (\text{constant}) \times (\text{energy usage})/(\text{degree days})/(\text{building area})$$

In another embodiment, function/algorithm 162 is a non-linear function which converts the ERN to an alpha score which is a letter grade in the set [A+, A, A−, B+, B, B−, C+, C, C−, D+, D, D−, F]. More specifically, in this alternative embodiment, the function will provide the alpha score letter output according to the following table:

| Alpha Score | ERN |
| --- | --- |
| A+ | 0.00 ≤ ERN < 3.25 |
| A | 3.25 ≤ ERN < 4.62 |
| A− | 4.62 ≤ ERN < 5.67 |
| B+ | 5.67 ≤ ERN < 6.17 |
| B | 6.17 ≤ ERN < 7.50 |
| B− | 7.50 ≤ ERN < 8.50 |
| C+ | 8.50 ≤ ERN < 9.50 |
| C | 9.50 ≤ ERN < 10.50 |
| C− | 10.50 ≤ ERN < 11.00 |
| D+ | 11.00 ≤ ERN < 11.5 |
| D | 11.5 ≤ ERN < 13.00 |
| D− | 13.00 ≤ ERN < 14.00 |
| F | 14.00 ≤ ERN |

System 100 is implemented on a microprocessor having a memory for holding software and data. In alternative embodiments, system 100 can be implemented on a server computer, a desktop computer, a smartphone, or other similar system. Temperature database 174 is implemented as a MySQL database, however other database systems, such as ORACLE® DB, MICROSOFT® SQL, Postgre, or other similar database may be used. The software may be programmed in Excel, JAVA®, C++, C, python, or some other similar language. The computer system 100 is implemented on may include an operating system such as MACOS® X, MICROSOFT WINDOWS® 7, LINUX®, or other similar operating system.

Figure 2:
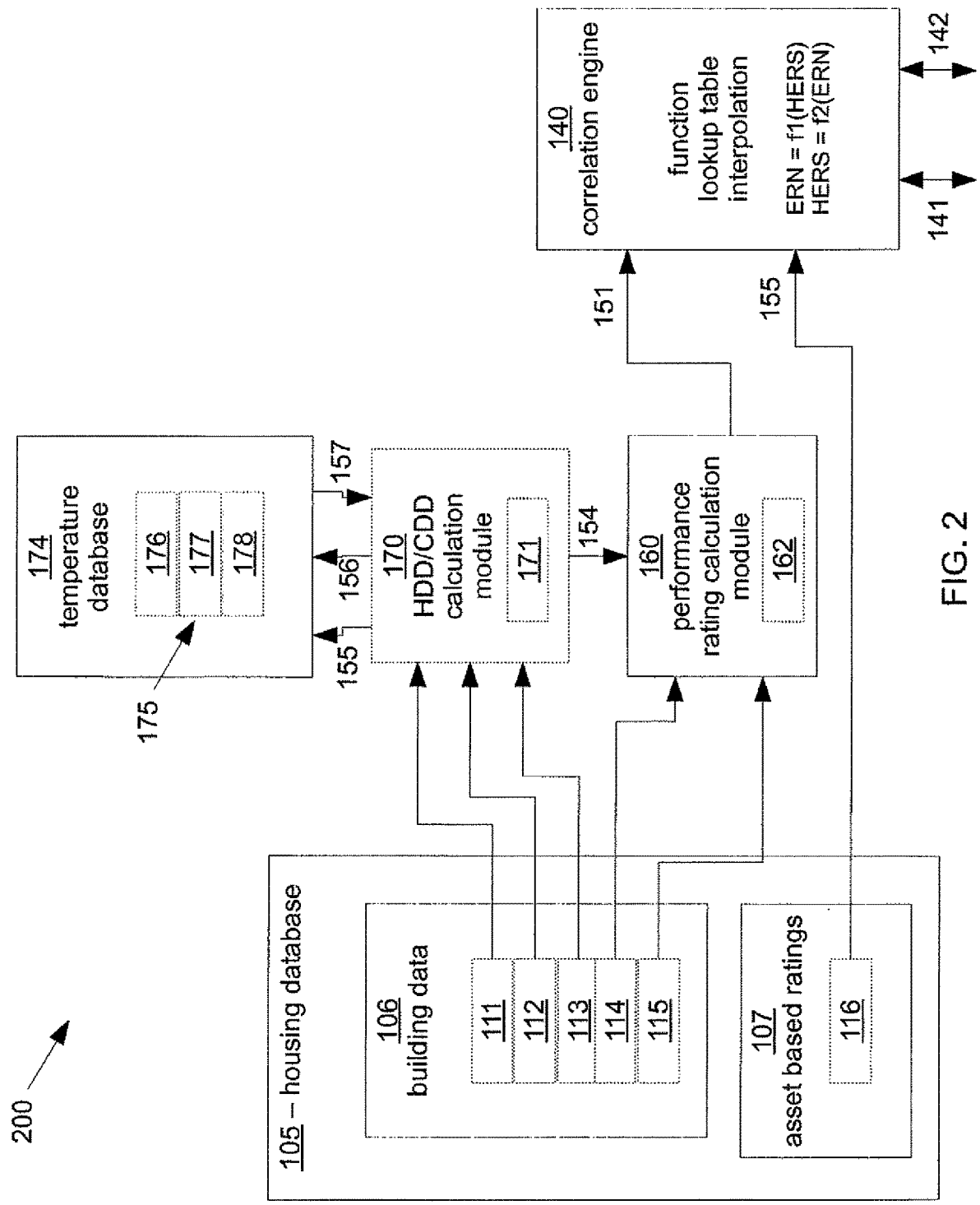
FIG. 2 is a block diagram of a second embodiment system for providing an estimate of an asset based energy rating.

Shown in FIG. 2 is a second embodiment system 200 for determining an ERN performance rating 151 and for providing a correlated RESNET rating 141 and HERS rating 142. System 200 is similar to system 100, but also has housing database 105, and correlation engine 140. Housing database 105 contains data records for a number of buildings. The data record for each building includes both building data 106 and certified asset based rating data 107. Asset based ratings 107 includes certified asset based ratings such as RESNET rating 116 and HERS rating 117. Having a large database of buildings with certified asset based ratings and performance based building data allows system 200 to accurately correlate performance based data to asset based data as is described in detail below.

Correlation engine 140 receives the calculated ERN 151 for each building entry in database 105 and determines a correlation function to correlate the ERN with the asset based RESNET rating 116 and/or the asset based HERS rating 117. More specifically, correlation engine 140 uses a function to correlate the ERN entries to the asset based ratings 107. A simple function which may be used by correlation engine 140 is an interpolation function. Another simple function is a linear regression, in which a slope and intercept are calculated using well known methods. More advanced versions of a correlation function involve using a higher order curve fit involve using higher order coefficients as described in Coope, I. D. (1993), in "Circle fitting by linear and nonlinear least squares", Journal of Optimization Theory and Applications 76 (2): 381. Other advanced correlation functions such as fuzzy logic and neural networks may also be used.

Figure 3:
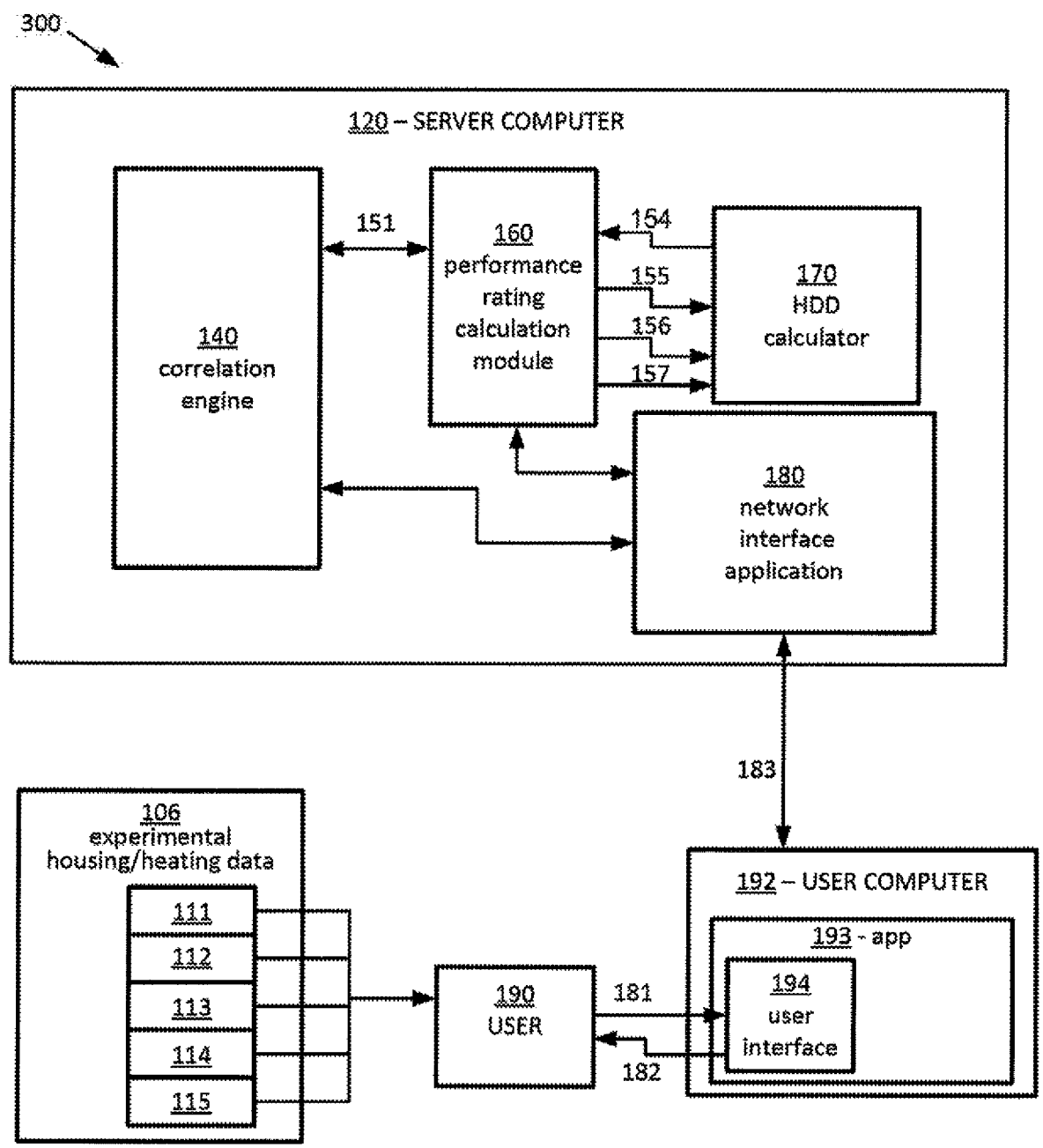
FIG. 3 is a block diagram of a third embodiment system for providing a building energy rating.

Shown in FIG. 3, is third embodiment building performance rating estimation system 300. System 300 has the major components of server computer 120 and user computer 192. User 190 provides actual past housing/heating data to user computer 192 as shown at 181, which is then relayed to server computer 120 via network interface application 180. Server computer 120 calculates a an estimated performance rating which is relayed through user computer 192 back to user 190 as shown at 182.

User computer 192 is used to relay experimental data 106 to server computer 120 as shown at 183, and also relay the estimated performance rating from server computer 120 to user 190. User computer 192 includes an app 193 and a user interface 194.

Therefore, while the presently-preferred form of the building energy performance rating system and method of building energy performance rating are disclosed and described, and several modifications discussed, persons skilled in this art will readily appreciate that various additional changes may be made without departing from the scope of the invention.

The invention claimed is:

1. A method of predicting energy usage comprising the steps of:
providing a computer;
providing a temperature database;
providing a building asset rating database;
receiving inputs from a user comprising:
a floor area measure of a building;
an energy usage measurement from a heating bill;
an energy usage start date from the heating bill;
an energy usage end date from the heating bill;
and a geographic location identifier;
determining an estimated energy rating as a function of said inputs, said temperature database, and said building asset rating database; and providing said estimated energy rating to said user; and
wherein said step of determining an estimated energy rating as a function of said inputs comprises the steps of: calculating the number of degree days between said energy usage start date and said energy usage end date for said building data geographic location identifier using data in said temperature database; calculating the energy usage per unit floor area per degree day; correlating the calculated energy usage per unit floor area per degree day with an asset-based energy rating in said building asset rating database.

2. The method as set forth in claim 1, wherein said temperature database comprises data records having said geographic location identifier, a temperature, and a date-time.

3. The method as set forth in claim 1, wherein said geographic location identifier is a zip code.

4. The method as set forth in claim 1, wherein said building asset rating database comprises building data records having an energy usage measurement, an energy usage start date, an energy usage end date, a geographic location, and an asset-based energy rating.

5. The method as set forth in claim 4, wherein said asset-based energy rating is a Home Energy Rating Score rating.

6. The method as set forth in claim 1, and further comprising the step of inserting actual building data into said building asset rating database.

7. The method as set forth in claim 1, and further comprising the steps of: connecting said computer to a network; and providing a web interface to said user.

8. The method as set forth in claim 1, and further comprising the step of providing said user an estimate of energy costs for a given time period.

9. The method as set forth in claim 1, wherein said inputs further comprises a number of building occupants, an electricity usage measurement, or a number of building rooms.

10. The method as set forth in claim 1, wherein said building asset rating database comprises multiple asset-based ratings selected from the group of Home Energy Rating Score home energy rating system, and Residential Energy Services Network rating.

11. The method as set forth in claim 1, and further comprising the step of providing said user a letter based estimated energy rating between A and F.

* * * * *